(12) United States Patent
Lee et al.

(10) Patent No.: US 12,063,397 B2
(45) Date of Patent: Aug. 13, 2024

(54) DISPLAY APPARATUS, DISPLAY METHOD, AND DISPLAY SYSTEM

(71) Applicant: SAMSUNG ELECTRONICS CO., LTD., Suwon-si (KR)

(72) Inventors: Young Ho Lee, Yongin-si (KR); Ho Nam Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/665,502

(22) Filed: Feb. 5, 2022

(65) Prior Publication Data
US 2022/0174340 A1 Jun. 2, 2022

Related U.S. Application Data

(63) Continuation of application No. 16/632,674, filed as application No. PCT/KR2018/005779 on May 21, 2018, now Pat. No. 11,284,132.

(30) Foreign Application Priority Data

Jul. 21, 2017 (KR) .......................... 10-2017-0092468

(51) Int. Cl.
H04N 21/2343 (2011.01)
H04N 21/422 (2011.01)

(52) U.S. Cl.
CPC ........... *H04N 21/234363* (2013.01); *H04N 21/234381* (2013.01); *H04N 21/42202* (2013.01)

(58) Field of Classification Search
None
See application file for complete search history.

(56) References Cited

U.S. PATENT DOCUMENTS

| 5,477,542 | A | 12/1995 | Takahara |
| 8,077,652 | B2 | 12/2011 | Thesling |

(Continued)

FOREIGN PATENT DOCUMENTS

| CN | 104284139 | 1/2015 |
| CN | 104580969 | 4/2015 |

(Continued)

OTHER PUBLICATIONS

Chen MJ, Chu MC, Pan CW. Efficient motion-estimation algorithm for reduced frame-rate video transcoder. IEEE Transactions on Circuits and Systems for Video Technology. Apr. 2002;12(4):269-75. (Year: 2002).*

(Continued)

*Primary Examiner* — Clifford Hilaire

(74) *Attorney, Agent, or Firm* — Nixon & Vanderhye, P.C.

(57) ABSTRACT

An example display apparatus includes a communicator configured to receive video content from a video service server through a network and transmit data to the video service server; an image processor configured to decode the video content and output an image frame; and an image display on which the image frame is displayed, wherein the image processor transmits one of a video resolution reduction signal for allowing the video service server to transmit video content having a resolution lower than a reference resolution in response to an increase in traffic of the network and a frame rate reduction signal for allowing the video (Continued)

service server to transmit video content having a frame rate lower than a reference frame rate in response to an increase in traffic of the network.

16 Claims, 14 Drawing Sheets

(56) References Cited

U.S. PATENT DOCUMENTS

| | | |
|---|---|---|
| 2003/0174243 A1 | 9/2003 | Arbeiter |
| 2004/0032906 A1 | 2/2004 | Lillig |
| 2010/0128054 A1 | 5/2010 | Manabe |
| 2010/0316126 A1 | 12/2010 | Chen |
| 2012/0189263 A1 | 7/2012 | Kato et al. |
| 2012/0291080 A1 | 11/2012 | McCutchen et al. |
| 2014/0186006 A1 | 7/2014 | Jin |
| 2014/0321561 A1 | 10/2014 | Stec et al. |
| 2015/0195625 A1 | 7/2015 | Ohbitsu |
| 2016/0249012 A1 | 8/2016 | Wang et al. |
| 2017/0223368 A1 | 8/2017 | Abbas |

FOREIGN PATENT DOCUMENTS

| | | |
|---|---|---|
| EP | 2 523 145 | 11/2012 |
| JP | 07-075092 | 3/1995 |
| JP | 2011-066790 | 3/2011 |
| JP | 2015-180029 | 10/2015 |
| KR | 10-2005-0055820 | 6/2005 |
| KR | 10-2009-0001094 | 1/2009 |
| KR | 10-2014-0006102 | 1/2014 |
| KR | 10-2014-0117237 | 10/2014 |
| WO | 2015/003250 | 1/2015 |

OTHER PUBLICATIONS

Shin, I.H., Lee, Y.L. and Park, H.W., 2004, May. Motion Estimation for Frame-Rate Reduction in H. 264 Transcoding. In WSTFEUS (pp. 63-67). (Year: 2004).*
Rejection Decision dated Apr. 20, 2022 in counterpart Chinese Application No. 201880047854.1 and English-language translation.
Extended Search Report dated Jun. 15, 2020 in counterpart European Patent Application No. EP18835036.7.
Communication pursuant to Article 94(3) EPC dated Mar. 23, 2021 in counterpart European Patent Application No. 18835036.7.
First Office Action dated Apr. 20, 2021 in counterpart Chinese Patent Application No. 201880047854.1 and English-language translation.
Notice of Preliminary Rejection dated Jul. 23, 2021 in counterpart Korean Patent Application No. 10-2017-0092468 and partial English-language translation.
Second Office Action dated Dec. 20, 2021 in counterpart Chinese Patent Application No. 201880047854.1 and English-language translation.
Notice of Preliminary Rejection dated Jan. 17, 2022 in counterpart Korean Patent Application No. 10-2017-0092468 and English-language translation.
International Search Report dated Oct. 10, 2018 in PCT/KR2018/005779 and English-language translation.
Written Opinion of the International Search Authority dated Oct. 10, 2018 and English-language translation.
Lee et al., U.S. Appl. No. 16/632,674, filed Jan. 21, 2020.

* cited by examiner

DISPLAY APPARATUS, DISPLAY METHOD, AND DISPLAY SYSTEM

CROSS-REFERENCE TO RELATED APPLICATIONS

This application is a continuation of U.S. application Ser. No. 16/632,674, filed on Jan. 21, 2020, which is the U.S. national phase of International Application No. PCT/KR2018/005779, filed May 21, 2018, which designated the U.S., and claims priority to Korean Patent Application No. 10-2017-0092468, filed on Jul. 21, 2017. The contents of each of these applications are incorporated herein in their entirety.

TECHNICAL FIELD

The disclosed disclosure relates to a display apparatus and a control method thereof, and more specifically, to a display apparatus, a display method, and a display system that are capable of performing a streaming service.

BACKGROUND ART

In general, an image display apparatus refers to an apparatus that displays various forms of image data by including a display panel.

For example, the image display apparatus may receive content data from various content sources, such as a broadcasting station, an internet server, an image reproducing apparatus, a game apparatus, and/or a portable terminal. In addition, the image display apparatus may reconstruct (or decode) an image frame from the content data and display the reconstructed image frame on the display panel.

Recently, a streaming service of content has been widely provided. The streaming service is a service for providing content in real time through a communication network, such as the Internet.

The streaming service is not only provided to a display apparatus in the home, such as a home television, a desktop computer, or a laptop computer, but is also provided to a large outdoor billboard using a display apparatus for advertisement.

The quality of a streaming service may be significantly affected by the traffic of the communication network.

SUMMARY

The present disclosure is directed to providing a display apparatus, a display method, and a display system that may minimize degradation of an image quality perceived by a user even when network traffic increases during a streaming service.

One aspect of the present disclosure provides a display apparatus including: a communicator configured to receive video content from a video service server through a network and transmit data to the video service server; an image processor configured to decode the video content and output an image frame; and an image display on which the image frame is displayed, wherein the image processor transmits, to the video service server, one of a video resolution reduction signal for allowing the video service server to transmit video content having a resolution lower than a reference resolution in response to an increase in traffic of the network and a frame rate reduction signal for allowing the video service server to transmit video content having a frame rate lower than a reference frame rate in response to an increase in traffic of the network.

The image processor may transmit the one of the video resolution reduction signal and the frame rate reduction signal on the basis of metadata of the video content to the video service server.

The image processor may transmit the one of the video resolution reduction signal and the frame rate reduction signal on the basis of motion vectors of the image frame to the video service server.

When the motion vectors have magnitudes smaller than a predetermined reference value, the image processor may transmit the frame rate reduction signal to the video service server.

When the motion vectors have magnitudes larger than a predetermined reference value and have directions distributed within a predetermined angle range, the image processor may transmit the frame rate reduction signal to the video service server.

When the motion vectors have magnitudes larger than a predetermined reference value and have directions distributed outside a predetermined angle range, the image processor may transmit the resolution reduction signal to the video service server.

The image processor may transmit the one of the video resolution reduction signal and the frame rate reduction signal on the basis of a depth map of the image frame to the video service server.

Upon receiving the video content having a resolution lower than the reference resolution from the video service server, the image processor may convert the image frame into an image frame having the reference resolution and output the image frame having the reference resolution.

Upon receiving the video content having a frame rate lower than the reference frame rate from the video service server, the image processor may generate a complementing image frame on the basis of the image frame, and output the complementing image frame.

The display apparatus may further include a luminance sensor configured to measure a luminance of a surrounding of the display apparatus, wherein the image processor may transmit the frame rate reduction signal to the video service server when a luminance value measured by the luminance sensor is smaller than a predetermined reference luminance value.

Another aspect of the present disclosure provides a display method including: receiving video content from a video service server through a network; decoding the video content into an image frame; transmitting, to the video service server, one of a video resolution reduction signal for allowing the video service server to transmit video content having a resolution lower than a reference resolution in response to an increase in traffic of the network and a frame rate reduction signal for allowing the video service server to transmit video content having a frame rate lower than a reference frame rate in response to an increase in traffic of the network; and displaying the image frame.

The transmitting of the one of the video resolution reduction signal and the frame rate reduction signal may include transmitting the one of the video resolution reduction signal and the frame rate reduction signal on the basis of at least one of metadata of the video content, motion vectors of the image frame, or a depth map of the image frame.

The display method may further include: measuring a luminance of a surrounding of a display apparatus; and transmitting the frame rate reduction signal to the video service server when the measured luminance value is smaller than a predetermined reference luminance value.

The display method may further include: upon receiving the video content having a resolution lower than the reference resolution from the video service server, converting the image frame into an image frame having the reference resolution; and outputting the image frame having the reference resolution.

The display method may further include: upon receiving the video content having a frame rate lower than the reference frame rate from the video service server, generating a complementing image frame on the basis of the image frame; and outputting the complementing image frame.

Another aspect of the present disclosure provides a display system including a video service server configured to transmit video content via a gateway server and a display apparatus configured to display an image frame corresponding to the video content and upon receiving a traffic increase signal from the gateway server, transmit one of a video resolution reduction signal and a frame rate reduction signal to the video service server, wherein the video service server transmits video content having a resolution lower than a reference resolution in response to the traffic increase signal from the gateway server and a video resolution reduction signal from the display apparatus and transmits video content having a frame rate lower than a reference frame rate in response to the traffic increase signal from the gateway server and a frame rate reduction signal from the display apparatus.

The display apparatus may select the one of the video resolution reduction signal and the frame rate reduction signal on the basis of at least one of meta data of the video content, motion vectors of the image frames, or a depth map of the image frame, and transmit the selected one of the video resolution reduction signal and the frame rate reduction signal to the video service server.

The display apparatus may measure a luminance of a surrounding of the display apparatus, and transmits the frame rate reduction signal to the video service server when the measured luminance value is smaller than a predetermined reference luminance value.

The display apparatus may, upon receiving the video content having a resolution lower than the reference resolution from the video service server, convert the image frame into an image frame having the reference resolution and output the image frame having the reference resolution.

The display apparatus may, upon receiving the video content having a frame rate lower than the reference frame rate from the video service server, generate a complementing image frame on the basis of the image frame, and output the complementing image frame.

As is apparent from the above, the display apparatus, the display method, and the display system can minimize degradation of an image quality perceived by a user even when network traffic increases during a streaming service.

DETAILED DESCRIPTION OF EXAMPLE EMBODIMENTS

Figure 1:
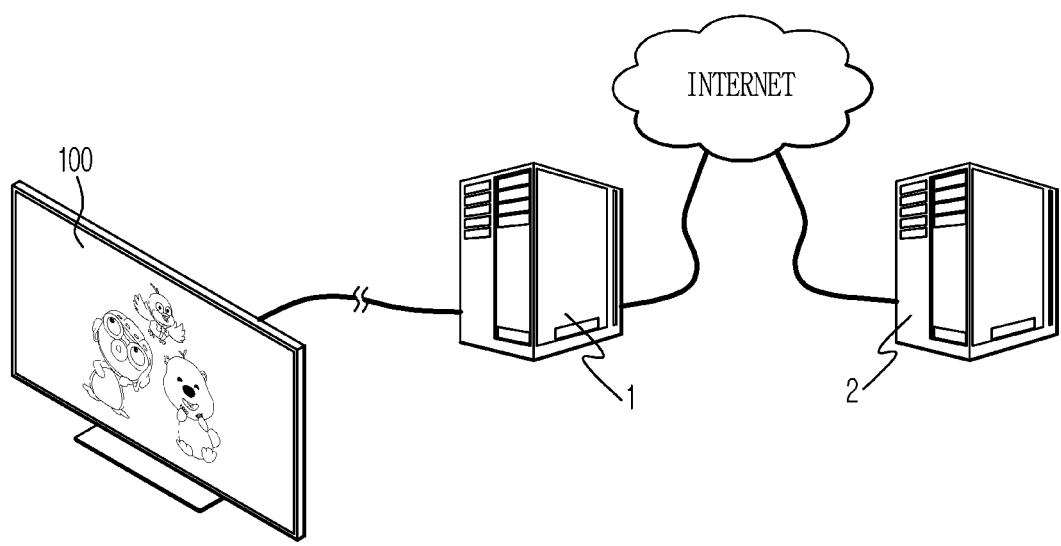
FIG. 1 and FIG. 2 illustrate a display apparatus and content sources according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

Hereinafter, the operating principles and embodiments of the disclosure will be described with reference to the accompanying drawings.

Figure 2:
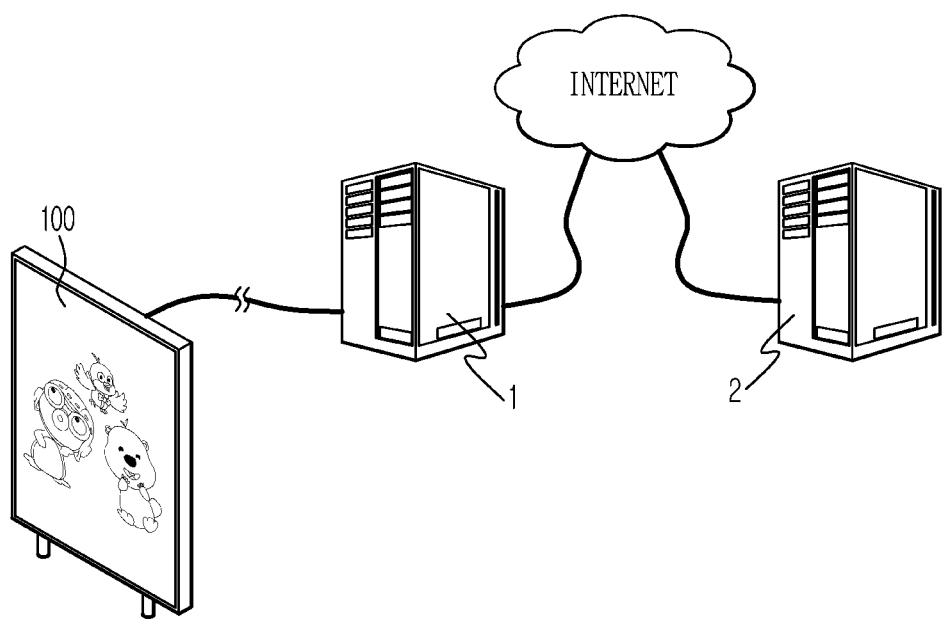

FIGS. 1 and 2 illustrate a display apparatus 100 and content sources according to an embodiment.

Referring to FIG. 1, the display apparatus 100 may be an apparatus provided indoors and configured to display an image, such as a television, a monitor, a display terminal, a portable terminal, a notebook computer, and the like.

In addition, the display apparatus 100 may be a large display apparatus (a large format display, LFD) installed outdoors, such as a building roof or a bus stop, as shown in FIG. 2. Here, the outdoors are not limited to an open-air place, and may include a place where a large number of people enter or exist, even inside a building, such as subway stations, shopping malls, cinemas, companies, shops, and the like, in which the display apparatus 100 according to the embodiment may be installed.

The display apparatus 100 may receive a video signal and an audio signal from various content sources, and output video and audio corresponding to the video signal and the audio signal.

For example, the display apparatus 100 may receive television broadcast content through a broadcast receiving antenna or a wired cable. The display apparatus 100 may output video and audio corresponding to a video signal and an audio signal included in the television broadcast content.

In addition, the display apparatus 100 may receive content from an image reproducing apparatus. The image reproducing apparatus may reproduce a recording medium in which various contents such as movies, sports, and the like are stored. The display apparatus 100 may receive a video signal and an audio signal from the image reproducing apparatus, and output video and audio corresponding to the video signal and the audio signal.

In particular, as shown in FIGS. 1 and 2, the display apparatus 100 may receive video content from a video service server 2 of a content provider (CP).

The CP may provide various types of video content through a wide area network (WAN) using the video service server 2. The video service server 2 stores various video contents, such as movies, dramas, sports, and the like, and transmits video content data in real time through a wide area network (for example, the Internet). In other words, the video service server 2 may provide a streaming service of video content.

The display apparatus 100 may access the wide area network through a network provided by an internet service provider (ISP).

The Internet service provider may provide a network to which a plurality of terminals are connected, and may relay a network of the Internet service provider with the wide area network using a gateway server 1. In this case, the gateway server 1 may be referred to as various other names, such as a router, a switch, a bridge, a network hub, a repeater, and the like.

The gateway server 1 of the Internet service provider may serve as a gateway for the display apparatus 100 to access the wide area network (e.g., the Internet). The display apparatus 100 may access the Internet through the gateway server 1 provided by the Internet service provider, and receive video content from the video service server 2 through the gateway server 1.

The gateway server 1 may control traffic of the network provided by the Internet service provider. For example, the gateway server 1 may include a plurality of gateways and may distribute the traffic between the plurality of gateways.

In addition, the gateway server 1 may monitor the network of the Internet service provider and provide the display apparatus 100 and/or the video service server 2 with information about the network traffic.

The video service server 2 may store various video contents. For example, the video service server 2 may store various video contents, such as movies, sports, and the like.

The video service server 2 may transmit video (consecutive image frames) and audio included in the video content to the display apparatus 100 through the network of the Internet service provider. In this case, since the network bandwidth of the Internet service provider is limited, the video service server 2 may compress and encode the video and the audio (hereinafter, compressing and encoding are collectively referred to as 'encoding'), and transmit the encoded video data and the encoded audio data to the display apparatus 100.

The video service server 2 may encode video and audio in a 'stream' form (hereinafter, referred to as a 'data stream') to transmit video content in real time. 'Encoding' may include compressing video content to reduce the capacity of the video content being transmitted, using standards, for example, moving picture experts group (MPEG), high efficiency video coding (HEVC), and the like. A 'data stream' may be a sequence of pieces of data (or bits) that are consecutive in time. The consecutive data stream contains video and audio, and the video and the audio may be reconstructed from the data stream. The display apparatus 100 receives the data stream from the video service server 2, decompresses and decodes the data stream (hereinafter, compressing and encoding are collectively referred to as 'decoding'), and outputs the decoded video and audio.

The video service server 2 may receive information about network traffic from the gateway server 1 of the Internet service provider, and may encode video and audio differently according to the network traffic.

For example, as the traffic of the network increases, the network bandwidth between the video service server 2 and the display apparatus 100 may decrease. In other words, as the traffic of the network increases, the transmission speed of data between the video service server 2 and the display apparatus 100, that is, the amount of data transmittable per unit time may decrease.

In order to achieve smooth video reproduction even with decreasing network bandwidth, the video service server 2 may reduce the resolution of the video or reduce the frame rate of the video The video service server 2 may provide video contents having different video resolutions. For example, the video service server 2 may store video contents having the same substance and different video resolutions. As another example, the video service server 2 may change the video resolution of the video content when transmitting the video content.

The video resolution may indicate the number of pixels of an image frame constituting the video. For example, an ultra-high definition (UHD) resolution image has 3840×2160 pixels, and a quad high definition (QHD) resolution image has 2560×1440 pixels. In addition, a full high definition (FHD) resolution image has 1920×1080 pixels, and a high definition (HD) resolution image has 1280×720 pixels.

As the video resolution is reduced, the size (or capacity) of the video is reduced, and the amount of data transmitted per unit time in the transmission of the video may be reduced. Thus, in response to an increase in the network traffic (i.e., a decrease in the amount of data transmittable per unit time), the video service server 2 may reduce the video resolution such that the video is seamlessly reproduced.

As such, the video service server 2 may transmit video content having a video resolution lower than a reference video resolution in response to an increase in the network traffic. In other words, in response to a decrease in the network bandwidth, the video service server 2 may successively transmit video content having the same substance but having a lowered video resolution.

The video service server 2 may provide video contents having different frame rates. For example, the video service server 2 may store video contents having the same substance but having different frame rates. As another example, the video service server 2 may change the frame rate of the video content when transmitting the video content.

The frame rate of the video may indicate the number of image frames per unit time constituting the video. For example, 60 fps (frames per second) may indicate displaying 60 image frames per second, and 30 fps may indicate displaying 30 image frames per second.

As the frame rate of the video is reduced, the amount of data transmitted per unit time in the transmission of the video may decrease. Thus, in response to an increase in the network traffic (i.e., a decrease in the amount of data transmittable per unit), the video service server 2 may reduce the frame rate of the video such that the video is seamlessly reproduced.

As such, in response to an increase in the network traffic, the video service server 2 may transmit video content having a frame rate lower than a reference frame rate. In other words, in response to a decrease in the network bandwidth, the video service server 2 may successively transmit video content having the same substance and having a lowered frame rate.

The display apparatus 100 may receive a video signal and an audio signal from the video service server 2, decode the video signal into video (a plurality of image frames), and display the image frames of the video.

In addition, the display apparatus 100 may select one of a video resolution reduction of the video content and a frame rate reduction of the video content in response to an increase in the network traffic. Specifically, in response to an increase in the network traffic, the display apparatus 100 may select whether to reduce the resolution of the video content (hereinafter referred to as 'video resolution reduction') or whether to reduce the frame rate of the video content (hereinafter, referred to as 'frame rate reduction').

For example, the display apparatus 100 may select one of the video resolution reduction and the frame rate reduction according to characteristics of content received from the video service server 2 and a viewing environment of a user, and transmit the selected traffic signal to the video service server 2.

The video service server 2 may transmit video content having a lowered video resolution or video content having a lowered frame rate according to the traffic signal in response to an increase in the network traffic. For example, when the video resolution reduction is selected by the display apparatus 100, the video service server 2 may transmit video content having a reduced video resolution in response to an increase in the network traffic, and when the frame rate reduction is selected by the display apparatus 100, the video service server 2 may transmit video content having a reduced frame rate in response to an increase in the network traffic.

Hereinafter, the configuration and operation of the display apparatus 100 is described.

Figure 3:
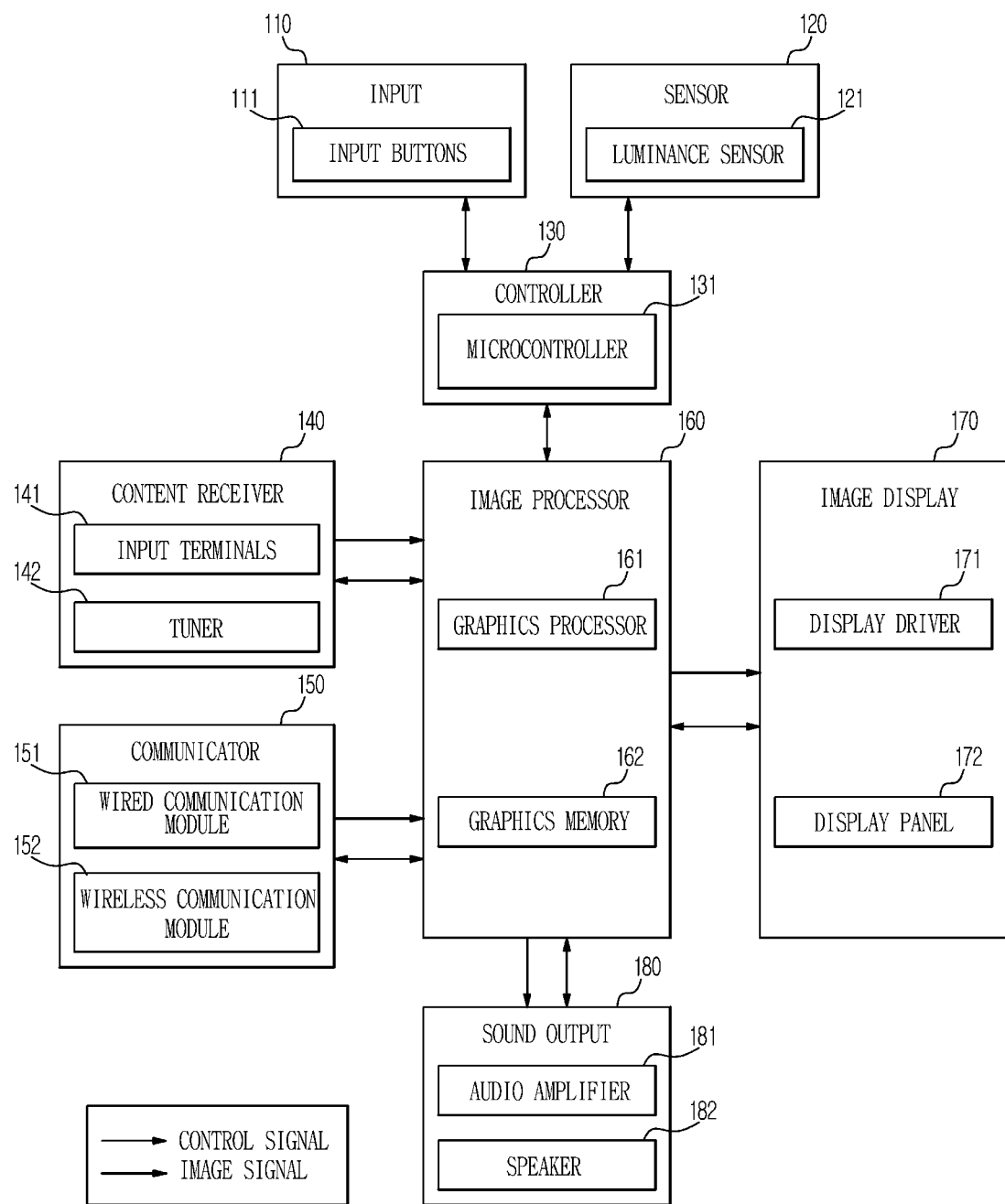
FIG. 3 illustrates a configuration of a display apparatus according to an embodiment.
Figure 4:
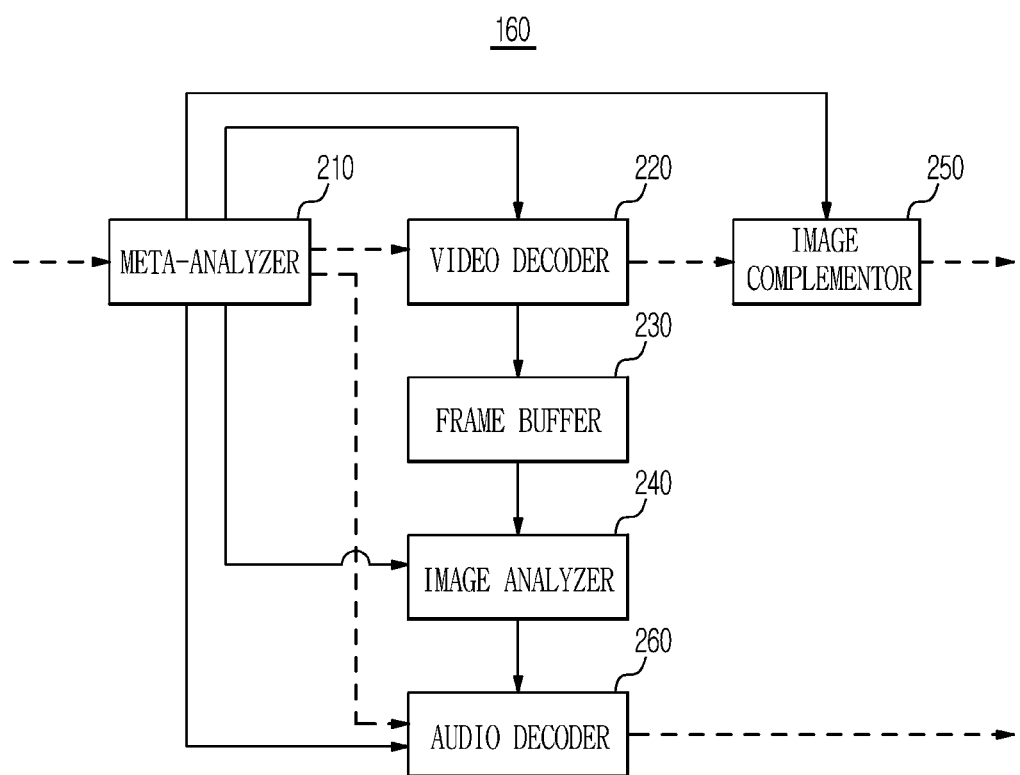
FIG. 4 illustrates a configuration of an image processor included in a display apparatus according to an embodiment.

FIG. 3 illustrates a configuration of the display apparatus 100 according to the embodiment. FIG. 4 illustrates a configuration of an image processor included in the display apparatus 100 according to the embodiment.

Referring to FIG. 3, the display apparatus 100 includes an input 110 that receives user input, a sensor 120 that collects information about surroundings of the display apparatus 100, a controller 130 that provides input from the input 110 and the sensor 120 to the image processor 160, a content receiver 140 that receives content data from content sources, and the image processor 160 that processes image data included in the content data received by the content receiver 140, an image display 170 that displays an image processed by the image processor 160, and a sound output 180 that outputs a sound processed by the image processor 160.

The input 110 may include input buttons 111 for receiving user input. For example, the input 110 may include a power button for turning on or off the display apparatus 100, a channel selection button for selecting broadcast content displayed on the display apparatus 100, a sound control button for adjusting the volume of a sound output by the display apparatus 100, a source selection button for selecting the content source, and the like.

The input buttons 111 may each receive user input and output an electrical signal corresponding to the user input to the controller 130.

The input buttons 111 may be implemented by various input devices, such as a push switch, a touch switch, a dial, a slide switch, a toggle switch, and the like.

A remote controller for receiving user input may be provided separately from the display apparatus 100. The remote controller may receive user input and transmit a wireless signal corresponding to the user input to the display apparatus 100. The input 110 may wirelessly receive the user input from the remote controller.

The sensor 120 may collect information about a surrounding environment of the display apparatus 100, that is, information about a viewing environment of the user. For example, the sensor 120 may include a luminance sensor 121 that measures ambient luminance of the display apparatus 100.

The luminance sensor 121 may output different electrical signals according to the ambient brightness. In detail, the luminance sensor 121 may detect the ambient brightness and output an electrical signal corresponding to the ambient brightness to the controller 130.

The luminance sensor 121 may include a cadmium sulfide (CdS) sensor that varies in electrical resistance according to ambient brightness, or may include a photodiode device that outputs different voltages according to ambient brightness.

The controller 130 may process the user input received through the input 110 and the detection result of the sensor 120, and provide the processing result to the image processor 160. For example, when a content source is selected through the input 110, the controller 130 may output a control signal to the content receiver 140 and/or the image processor 160 such that content is received from the selected content source.

The controller 130 may include a microcontroller 131 generating a control signal according to user input and/or a detection result. For example, the microcontroller 131 may generate a content selection signal for selecting a content source according to user input, and may output the content selection signal to the image processor 160.

The microcontroller 131 may include an operation circuit (e.g., an arithmetic lotic unit: ALU) for performing logical operations and arithmetic operations and a memory circuit (e.g., a volatile memory, such as S-RAM, D-RAM, etc., and a non-volatile memory, such as a ROM, an EPROM, an EEPROM, a flash memory, and the like) for memorizing the calculated data.

The content receiver 140 may include input terminals 141 and a tuner 142 that receive content data from content sources.

The input terminals 141 may receive a video signal and an audio signal from content sources via a cable. In other words, the display apparatus 100 may receive a video signal and an audio signal from content sources through the input terminals 141.

The input terminals 141 may be, for example, a component (component, YPbPr/RGB) terminal, a composite (composite video blanking and sync (CVBS)) terminal, an audio terminal, a high definition multimedia interface (HDMI) terminal, a universal serial bus (USB) terminal, and the like.

The tuner 142 may receive broadcast signals and extract a broadcast signal of a channel selected by the user from the broadcast signals. For example, the tuner 142 may pass a broadcast signal having a frequency corresponding to a channel selected by a user among a plurality of broadcast signals received through a broadcast receiving antenna or a wired cable, and block broadcast signals having other frequencies.

As such, the content receiver 140 may receive a video signal and an audio signal from content sources through the input terminals 141 and/or the tuner 142, and output the video signal and the audio signal received through the input terminals 141 and/or the tuner 142 to the image processor 160.

In addition, the user may select one of a plurality of content sources through the input 110, and the control unit 130 may output a content selection signal to the content receiver 140 and/or the image processor 160 according to the user's selection.

The communicator 150 may include a wired communication module 151 and a wireless communication module 152 that may exchange data with the video service server 2.

The wired communication module 151 may access the gateway server 1 through a cable connected from the display apparatus 100 to the gateway server 1 of the internet service provider. For example, the wired communication module 151 may communicate with the gateway server 1 through Ethernet (IEEE 802.3 technical standard).

The wired communication module 151 may exchange data with the video service server 2 on the wide area network via the gateway server 1.

The wireless communication module 152 may wirelessly communicate with an access point (AP) (or a gateway of a user) connected with the gateway server 1. For example, the wireless communication module 152 may communicate with the AP via Wi-Fi (WiFi™, IEEE 802.11 technology standard), Bluetooth (Bluetooth™, IEEE 802.15.1 technology standard), or Zigbee (ZigBee™, IEEE 802.15.4 technology standard). In addition, the access point may be connected to the gateway server 1.

The wireless communication module 152 may exchange data with the video service server 2 on the wide area network via the access point and the gateway server 1.

As such, the communicator 150 may exchange data with the video service server 2 through the gateway server 1, and the display apparatus 100 may receive a data stream including content from the video service server 2 through the communicator 150. For example, the data stream received by the communicator 150 may be input to the image processor 160.

In addition, the display apparatus 100 may transmit the traffic signal to the video service server 2 through the communicator 150.

The image processor 160 may process the data stream of video/audio received from the content receiver 140 and generate image frame data and sound data. In detail, the image processor 160 may decode the video data stream into an image frame, and decode the audio data stream into sound data.

In addition, the image processor 160 may output the image frame data to the image display 170 and output the sound data to the sound output 180.

The image processor 160 may structurally include a graphics processor 161 and a graphics memory 162 as shown in FIG. 3.

The graphics memory 162 may store a program and data for image processing. For example, the graphics memory 162 may store a program and data for video decoding, or temporarily memorize image data generated during image processing of the graphics processor 161. In other words, the graphics memory 162 may operate as an image buffer.

The graphics memory 162 may include a nonvolatile memory, such as a read only memory (ROM), an erasable programmable read only memory (EPROM), and an electrically erasable programmable read only memory (EEPROM), for storing data for a long time, and a volatile memory, such as static random access memory (S-RAM) and dynamic random access memory (D-RAM) for temporarily memorizing data.

The graphics processor 161 may perform image processing. For example, the graphics processor 161 may decode a data stream into an image frame according to a program and data stored in the graphics memory 162. Also, the graphics processor 161 may temporarily store image data in the graphics memory 162 and retrieve the image data from the graphics memory 162.

The graphics processor 161 may include an operation circuit (e.g., an arithmetic logic unit: ALU) for performing logical and arithmetic operations, a memory circuit (e.g., a register) for memorizing data, and a control circuit for controlling the operation of the graphics processor 161.

Also, referring to FIG. 4, the image processor 160 may functionally include a meta-analyzer 210 for analyzing metadata of a data stream, a video decoder 220 for decoding a data stream into image frame data, a frame buffer 230 for temporarily memorizing image frames, an image complementor 250 for complementing the image frames, an image analyzer 240 for analyzing the image frames, and an audio decoder 260 for decoding the data stream into sound data.

The meta analyzer 210 may extract metadata included in a data stream received from the video service server 2.

The metadata may include information regarding the content itself included in the data stream, information regarding video of the content, and information regarding audio of the content. For example, the metadata may include a title of the content, a type of the content, a genre of the content, a creator of the content, and the like as the information regarding the content itself. The metadata may include an encoding codec of the video, a resolution of the video, a frame rate of the video, and the like as the information regarding the video. In addition, the metadata may include an encoding codec of the audio, a frequency bandwidth of the audio, the number of channels of the audio, and the like as the information regarding the audio.

The meta analyzer 210 may memorize the metadata regarding content, the metadata regarding video, and the metadata regarding audio.

The video decoder 220 may set a video decoding option on the basis of the metadata regarding video. The audio decoder 260 may set an audio decoding option on the basis of the metadata regarding audio. The image complementor 250 may complement an image frame on the basis of the metadata regarding video. In addition, the image analyzer 240 may determine an image characteristic of the video on the basis of the metadata regarding content.

The video decoding option may indicate a setting value for decoding a data stream into image frame data, and may be determined according to a video encoding option set in the video service server 2. For example, the video encoding option may include a motion estimation algorithm, an encoding mode (a rate control), a bitrate, and the like, and the video decoding option may be determined by the video encoding option.

The audio decoding option may indicate a setting value for decoding a data stream into audio data, and may be determined according to an audio encoding option set in the video service server 2.

The video decoder 220 may decode a data stream and reconstruct image frame data. In detail, the video decoder 220 may set a video decoding option on the basis of the metadata, decode a data stream according to the set video decoding option, and reconstruct an image frame. For example, the video decoder 220 may decode a data stream into image frame data using a digital image compression algorithm, such as moving picture experts group (MPEG)-2, MPEG4-4, or high efficiency video coding (HEVC).

The frame buffer 230 may store image frames decoded by the video decoder 220. For example, with respect to image frames output from the image processor 160, the frame buffer 230 may store 'a current image frame (an image frame currently being output)', 'a previous image frame (an image frame previously output)', and 'a next image frame (an image frame not output after being decoded)'.

The frame buffer 230 may be implemented using the graphics memory 162 described above.

The image analyzer 240 may determine an image characteristic and/or a unique characteristic of content on the basis of the image frames stored in the frame buffer 230 and the metadata of the content. For example, the image analyzer 240 may determine a motion characteristic and a depth characteristic of an image from the image frames, and determine the image characteristic of the content from the motion characteristic and the depth characteristic. The image analyzer 240 may determine the unique characteristic, such as the type and/or genre of the content, on the basis of the metadata of the content. In addition, the image analyzer 240 may receive a detection result of the sensor 120, that is, information about a viewing environment of the user, from the controller 130. For example, the image analyzer 240 may receive information about a luminance value of the surrounding of the display apparatus 100 from the controller 130.

The image analyzer 240 may select one of a video resolution reduction and a frame rate reduction on the basis of the image characteristic of the content, the unique characteristic of the content, and the user's viewing environment (for example, a luminance value). In addition, the image analyzer 240 may transmit a video resolution reduction signal or a frame rate reduction signal to the video service server 2 through the communicator 150.

The image complementor 250 may complement an image frame that is reduced in a video resolution or a frame rate. For example, the image complementor 250, in response to receiving video with a reduced video resolution from the video service server 2, may complement the video resolution of the image frame, and in response to receiving video with a reduced frame rate from the video service server 2, may complement the frame rate of the image frame.

In addition, the image complementor 250 may determine the resolution reduction of the image frame or the frame rate reduction of the image frame on the basis of metadata regarding video resolution and/or video frame.

The audio decoder 260 may decode the data stream and recover the audio data. In detail, the audio decoder 260 may set an audio decoding option on the basis of the metadata, decode the data stream according to the set audio decoding option, and reconstruct sound. For example, the audio decoder 260 may decode the data stream into audio data using a digital sound compression algorithm, such as Advanced Audio Coding (AAC), High-Efficiency Advanced Audio Coding (HE-AAC), or the like.

Referring again to FIG. 3, the image display 170 includes a display panel 172 for visually displaying an image and a display driver 171 for driving the display panel 172.

The display panel 172 may generate an image according to the image data received from the display driver 171 and output the image.

The display panel 172 may include a pixel that serves as a unit for displaying an image. Each pixel may receive an electrical signal representing image data and output an optical signal corresponding to the received electrical signal. As such, the optical signals output from the plurality of pixels are combined such that an image is displayed on the display panel 172.

The display panel 172 may be provided using a cathode ray tube (CRT) display, a liquid crystal display (LCD) panel, a light emitting diode (LED) panel, an organic light emitting diode (OLED) panel, a plasma display panel (PDP) panel, a field emission display (FED) panel, and the like. However, the display panel 172 is not limited thereto, and may be implemented using various display methods capable of visually displaying an image corresponding to image data.

The display driver 171 receives the image data from the image processor 160 and drives the display panel 172 to display an image corresponding to the received image data.

In detail, the display driver 171 transmits an electrical signal corresponding to the image frame data to each of the plurality of pixels constituting the display panel 172. In particular, the display driver 171 may transmit the electrical signal to each pixel in various ways such that the electrical signals are transmitted to all the pixels constituting the display panel 172 within a short time.

As such, when the display driver 171 transmits the electrical signal corresponding to the image data to each pixel constituting the display panel 172, each pixel outputs an optical signal corresponding to the received electrical signal, and the optical signals output from the respective pixels are combined so that a single image may be displayed on the display panel 172.

The sound output 180 includes an audio amplifier 181 for amplifying sound, and a speaker 182 for audibly outputting the amplified sound.

The audio amplifier 181 may amplify an electrical acoustic signal processed by the image processor 160. The audio amplifier 181 may include a vacuum tube or a transistor for amplifying an electric acoustic signal.

The speaker 182 may convert the electrical acoustic signal output by the audio amplifier 181 into an audible sound. For example, the speaker 182 may include a thin film that vibrates according to an electrical acoustic signal, and sound (sound waves) may be generated by the vibration of the thin film.

In the above description, the controller 130 and the image processor 160 are illustrated as being separated from each other, but the controller 130 and the image processor 160 are not structurally distinguished. For example, the controller 130 and the image processor 160 may be implemented as separate chips or a single chip.

Hereinafter, the operation of the display apparatus 100 will be described.

Figure 5:
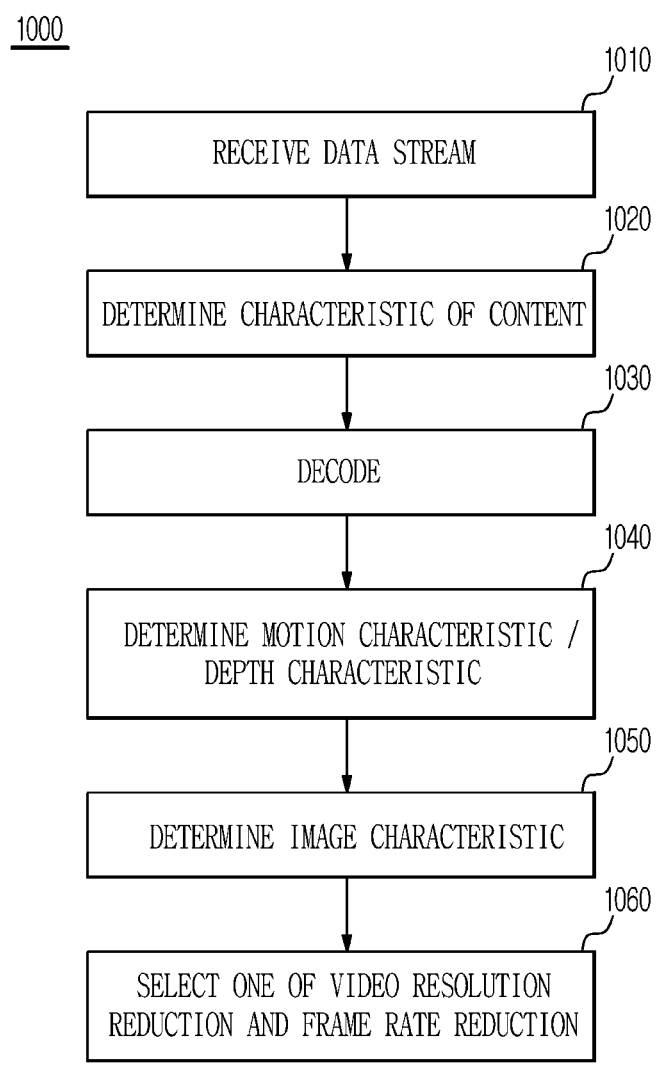
FIG. 5 illustrates an example of an operation of a display apparatus according to an embodiment.

FIG. 5 illustrates an example of an operation of a display apparatus according to an embodiment Referring to FIG. 5, an operation (1000) of the display apparatus 100 is described.

The display apparatus 100 receives a data stream (1010).

The communicator 150 may receive the data stream from the video service server 2 and output the received data stream to the image processor 160. The image processor 160 receives the data stream from the communicator 150.

The communicator 150 may exchange data with the video service server 2 via the gateway server 1 of the Internet service provider. In particular, the communicator 150 may receive a data stream for reproducing content from the video service server 2 in real time. The received data stream may be output from the communicator 150 to the image processor 160.

Thereafter, the display apparatus 100 determines a characteristic of the content (1020).

In order to determine the characteristic of the content, the image processor 160 may extract metadata included in the data stream and analyze the metadata.

The metadata may include metadata regarding content, metadata regarding video, and metadata regarding audio. The metadata regarding the content may include information about the content itself, such as the title of the content, the type of the content, the genre of the content, and the creator of the content.

The image processor 160 may analyze the metadata regarding the content. The image processor 160 may determine one of a video resolution reduction and a frame rate reduction on the basis of the type of the content and the genre of the content in the metadata regarding the content.

For example, when the type of the content is sports, a large number of image changes (e.g., a large number of screen transitions) may exist in the video, and a large number of motions may exist in the image. When a large number of image changes exist as described above, a high frame rate is maintained such that a lot of image information is provided to the user. Therefore, when the content type is sports, the image processor 160 may select the video resolution reduction.

In addition, when the type of the content is a movie and the genre of the content is an action movie, a large number of motions exists in the image as in sports. Therefore, when the type of the content is a movie and the genre of the content is an action movie, the image processor 160 may select the video resolution reduction.

In addition, when the type of the content is a movie and the genre of the content is a drama or comedy, a small number of image changes exist in the video, and a small number of motions exist in the image. As such, when the number of image changes is small, the video resolution is maintained at a high resolution to provide the user with a high-quality image. Therefore, when the type of the content is a movie and the genre of the content is drama or comedy, the image processor 160 may select a frame rate reduction.

Although the metadata regarding the content is used to determine the characteristics of the content, the image processor 160 may not only use the metadata regarding the content in selecting one of the video resolution reduction and the frame rate reduction.

After that, the display apparatus 100 decodes the data stream into an image frame (1030).

Before decoding the data stream, the image processor 160 may extract the metadata regarding the video from the data stream, and set a video decoding option on the basis of the metadata regarding the video. The video decoding option is determined by a video encoding option, and the metadata regarding the video may include the video encoding option.

After setting the video decoding option, the image processor 160 may decode the data stream and reconstruct the image frame data. The image processor 160 may decode the data stream into image frame data using a digital image compression algorithm, such as Moving Picture Experts Group (MPEG)-2, MPEG4-4, high efficiency video coding (HEVC), and the like.

In addition, the image processor 160 may store the image frame data in the frame buffer 230.

Thereafter, the display apparatus 100 determines a motion characteristic and a depth characteristic of the image (1040).

The image processor 160 may determine the motion characteristic of the image and the depth characteristic of the image on the basis of the image frame stored in the frame buffer 230.

For example, the image processor 160 calculates a motion vector of the image on the basis of 'the current image frame' and 'the previous image frame' stored in the frame buffer 230, and may determine the motion characteristic of the image on the basis of the motion vector of the image.

Here, 'the motion vector of the image' may represent the motion of an object in the image and/or the motion of the entire image. For example, an image may be divided into a plurality of blocks, and a motion vector may represent a moving size and a moving direction of the image in each block.

In addition, 'the motion characteristic' may represent the form of a motion of the entire image and/or the form of a motion of the object. For example, the motion characteristic may include the motion of the entire image, such as panning, pilot-view, zoom-in, zoom-out, and the like, and may include the motion of the object in the image including the moving size and the moving direction of the image.

As such, the image processor 160 may determine the motion characteristics of the image including the motion of the entire image and/or the motion of the object in the image on the basis of 'the current image frame' and 'the previous image frame'.

In addition, the image processor 160 may calculate a depth map of the image on the basis of 'the current image frame' stored in the frame buffer 230, and determine the depth characteristic of the image on the basis of the depth map of the image.

Here, 'the depth map' may represent the distance from a reference position (e.g., the location of 'a photographer or an observer' who photographed the image) to an object in the image. For example, the image may be divided into a plurality of blocks, and the depth map may represent a distance from the reference position to each block.

A three-dimensional image photographed by a stereo camera or the like generally includes an image and a depth map of the image. However, a depth map may be calculated from a two-dimensional image. For example, the relative distances of blocks with respect to the reference position may be determined according to the relative positions of the blocks from a vanishing point of the image. In addition, the relative distances of the objects with respect to the reference position in the image may be determined on the basis of the relative position and clearness of the objects in the image.

In addition, 'the depth characteristic' may include the relative distance of each object in the image (e.g., the distance from the 'photographer' photographed the image), the relative positional relationship between the objects and/or the areas occupied by the objects located in the front, of the image.

The image processor 160 may generate a depth map of the image on the basis of 'the current image frame' and determine the depth characteristic of the image on the basis of the depth map of the image.

The determining of the motion characteristic of the image and the depth characteristic of the image is described in more detail below.

Subsequently, the display apparatus 100 determines the characteristic of the image (1050).

The image processor 160 determines the characteristic of the image on the basis of the characteristic of the content, the motion characteristic of the image, and the depth characteristic of the image.

For example, the image processor 160 may determine the speed and/or the degree of movement of the entire image and the speed and/or the degree of movement of the objects in the image on the basis of the motion characteristics of the image. Also, the image processor 160 may determine the relative positions of the objects in the image and/or the distribution of the objects in the image on the basis of the depth characteristic.

After that, the display apparatus 100 selects one of the video resolution reduction and the frame rate reduction (1060).

The image processor 160 may determine one of the video resolution reduction and the frame rate reduction on the basis of the characteristic of the image. In detail, the image processor 160 may select one of the video resolution reduction and the frame rate reduction on the basis of the characteristic of the image.

For example, the image processor 160 may determine one of the video resolution reduction and the frame rate reduction according to the characteristic of the content. When the type of the content is sports or an action movie, the image processor 160 may select the video resolution reduction, and when the type of the content is a movie and the genre of the content is a drama or comedy, the image processor 160 may select the frame rate reduction.

As another example, when the motion sizes of the objects in the image are greater than or equal to a reference value and all of the motion directions of the objects in the image are within a predetermined angle range, the image processor 160 may select the video resolution reduction for maintaining the frame rate to rapidly display the motion of the image and reducing the video resolution. When the motion sizes of the objects in the image are greater than or equal to the reference value and the motion directions of the objects in the image are distributed in various ways, the image processor 160 may easily complement the image frame, and thus select the frame rate reduction for maintaining the video resolution and reducing the frame rate. In addition, when the motion sizes of the objects in the image are smaller than the reference value, the image processor 160 may select the frame rate reduction for maintaining the video resolution and reducing the frame rate to display a high-quality image.

As another example, when the front object occupies a wide part in the image, a constant motion of the object is expected, and thus the image processor 160 may select the frame rate reduction. In addition, when objects located at a distant (far from the photographer) are dispersed in the image, various motions of the objects are expected, and thus the image processor 160 may select the video resolution reduction.

After selecting one of the video resolution reduction and the frame rate reduction, the image processor 160 may transmit a traffic signal to the video service server 2 through the communicator 150. For example, the image processor 160 may transmit a video resolution reduction signal to the video service server 2 or a frame rate reduction signal to the video service server 2 according to the selection.

As described above, the display apparatus 100 may analyze an image frame and select one of the video resolution reduction and the frame rate reduction according to the analysis result.

The display apparatus 100 selects one of the video resolution reduction and frame rate reduction every predetermined time. For example, the display apparatus 100 may select one of the video resolution reduction and the frame rate reduction regardless of the network environment of the Internet service provider and transmit a video resolution reduction signal or a frame rate reduction signal to the video service server 2.

In addition, the display apparatus 100 may select one of the video resolution reduction and the frame rate reduction when network traffic increases. The display apparatus 100 may receive information about traffic of the network from the gateway server 1 of the internet service provider. The display apparatus 100 may determine the traffic of the network on the basis of the information received from the gateway server 1. When the network traffic is greater than a reference value, the display apparatus 100 may select one of the video resolution reduction and the frame rate reduction, and transmit a video resolution reduction signal or a frame rate reduction signal to the video service server 2.

Figure 6:
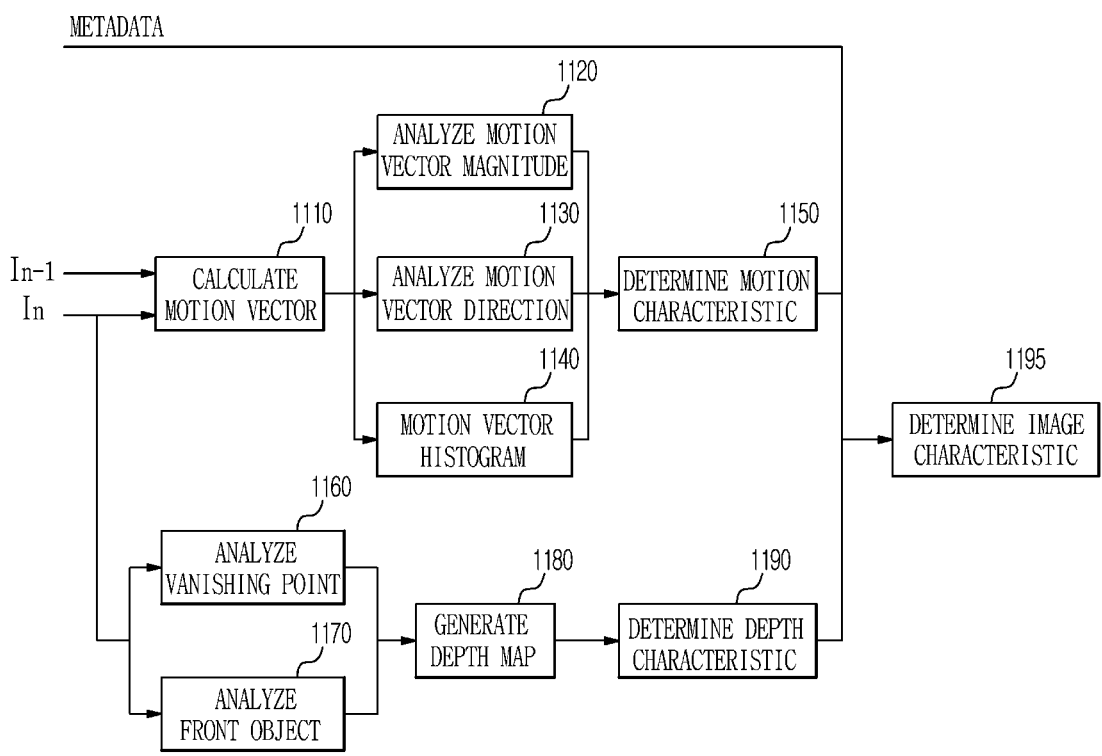
FIG. 6 illustrates a method of determining a motion characteristic/depth characteristic by a display apparatus according to an embodiment.
Figure 7:
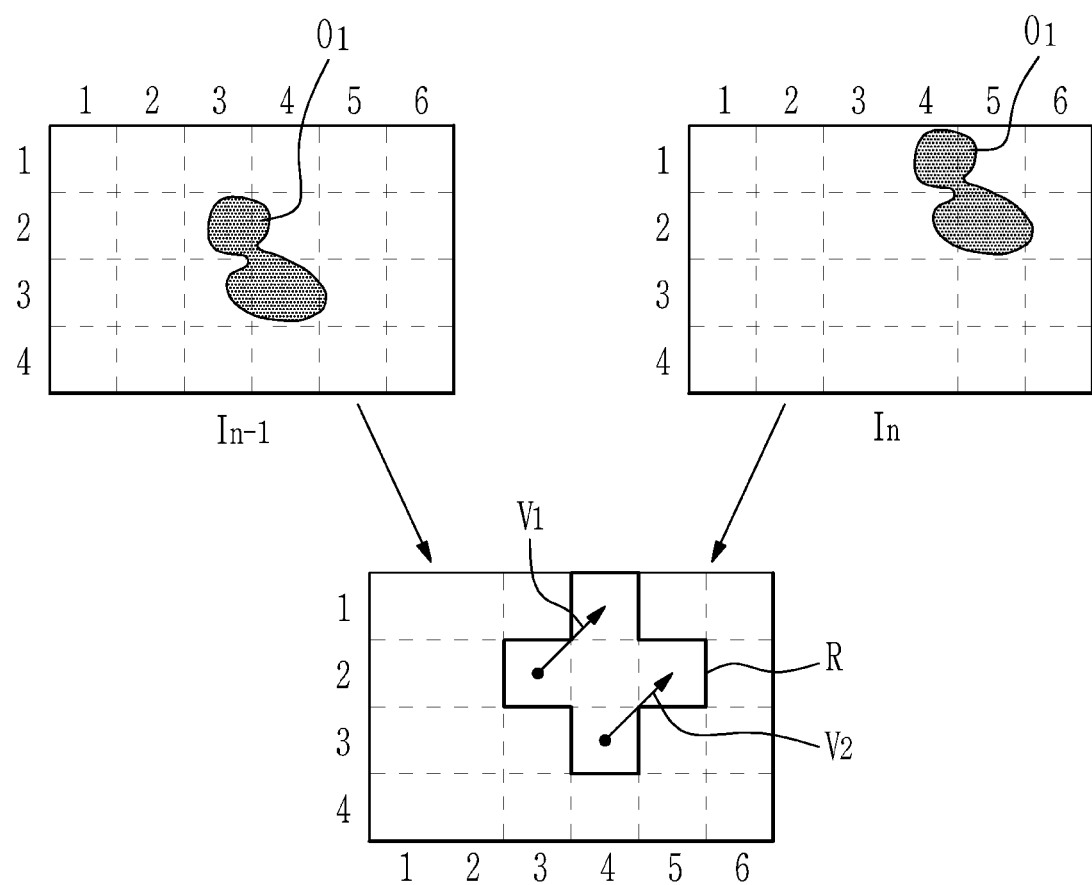
FIG. 7 illustrates an example of estimating a motion vector by the determination method shown in FIG. 6.
Figure 9:
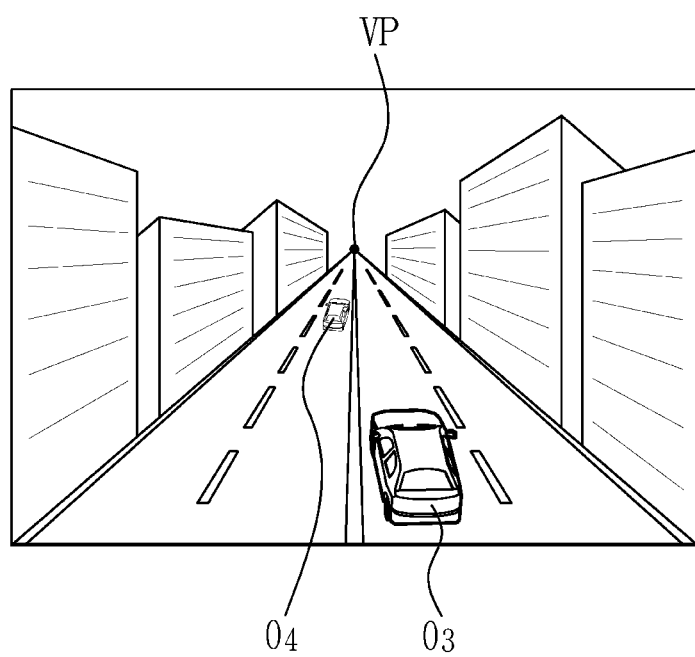
FIG. 9 illustrates an example of estimating a vanishing point by the determination method shown in FIG. 6.
Figure 10:
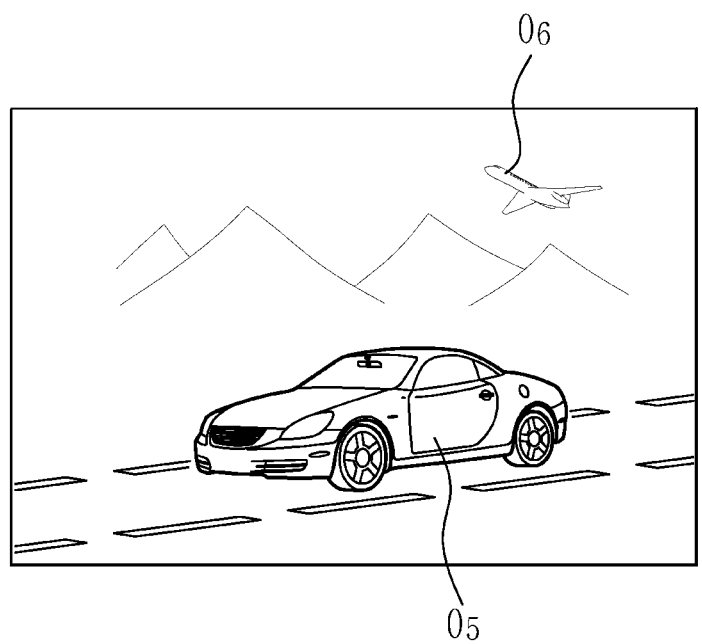
FIG. 10 illustrates an example of estimating a front object by the determination method shown in FIG. 6.

FIG. 6 illustrates a method of determining a motion characteristic/depth characteristic by a display apparatus according to an embodiment. FIG. 7 illustrates an example of estimating a motion vector by the determination method shown in FIG. 6. FIG. 8 illustrates an example of determining characteristics of an image on the basis of a motion vector by the determination method shown in FIG. 6. FIG. 9 illustrates an example of estimating a vanishing point by the determination method shown in FIG. 6. FIG. 10 illustrates an example of estimating a front object by the determination method shown in FIG. 6.

Referring to FIGS. 6, 7, 8, 9, and 10, a method (1100) of determining a motion characteristic/depth characteristic is described.

The display apparatus 100 calculates a motion vector (1110).

The image processor 160 may estimate a motion vector on the basis of an $n^{th}$ image frame In (for example, 'a current image frame') and an $n-1^{th}$ image frame In−1 (for example, 'a previous image') stored in the frame buffer 230.

For example, as illustrated in FIG. 7, the image processor 160 may divide the $n-1^{th}$ image frame In−1 into a plurality of blocks B11, . . . , B16, B21, . . . B26, B31, . . . B36, and B41, . . . B46. In addition, the image processor 160 may divide the n$^{th}$ image frame In into a plurality of blocks B11, . . . , B16, B21, . . . B26, B31, . . . B36, and B41, . . . B46.

Thereafter, the image processor 160 matches the blocks B11 to B46 of the n−1$^{th}$ image frame In−1 with the n$^{th}$ image frame In. In other words, the image processor 160 searches for a portion of the n$^{th}$ image frame In that matches the blocks B11 to B46 of the n−1$^{th}$ image frame In−1.

For example, the image processor 160 may search for a portion of the n$^{th}$ image frame In that matches the block-32 B32 of the n−1$^{th}$ image frame In−1. Also, the image processor 160 may search for a portion of the n$^{th}$ image frame In that matches the block-43 B43 of the n−1$^{th}$ image frame In−1.

When the portions of the n$^{th}$ image frame In that match the blocks B11 to B46 of the n−1$^{th}$ image frame In−1 are found, the image processor 160 calculates the coordinate difference between the blocks B11 to B46 of the n−1$^{th}$ image frame In−1 and the corresponding portions of the n$^{th}$ image frame In. The image processor 160 may calculate a motion vector on the basis of the calculated coordinate difference.

For example, the block-32 B32 of the n−1$^{th}$ image frame In−1 and the block-41 B41 of the n$^{th}$ image frame In may match each other. The image processor 160 may calculate a motion vector V1 of the block-32 B32 of the n−1$^{th}$ image frame In−1. The motion vector V1 of the block-32 B32 of the n−1$^{th}$ image frame In−1 may be expressed as [+1, −1].

In addition, the block-43 B43 of the n−1$^{th}$ image frame In−1 may match the block-52 B52 of the n$^{th}$ image frame In. The image processor 160 may calculate a motion vector V2 of the block-43 B43 of the n−1$^{th}$ image frame In−1. The motion vector V2 of the block-43 B43 of the n−1$^{th}$ image frame In−1 may be expressed as [+1, −1].

Such motion vectors V1 and V2 are caused by a movement of an object O1 in the image and are intensively generated at a portion where the object O1 is displayed. When the motion vector is calculated, the image processor 160 may determine a region in which the motion vector is not '0', that is, a motion detection region R. The motion detection region R may be the same as a portion in which a motion of the image is detected. For example, the motion detection region R may include the block-41 B41, the block-32 B32, the block-42 B42, the block-52 B52, and the block-43 B43 in which a motion of the image is detected.

The display apparatus 100 analyzes the magnitude of the motion vector (1120).

The image processor 160 may calculate the magnitude of the motion vector calculated in operation 1110. The magnitude of the motion vector may be calculated as the square root of the sum of the square of an x-axis component and the square of a y-axis component of the motion vector.

For example, the motion vector V1 of the block-32 B32 of the n−1$^{th}$ image frame In−1 may be expressed as [+1, −1], and the magnitude of the motion vector V1 is equal to the square root of 2. In addition, the motion vector V2 of the block-43 B43 of the n−1$^{th}$ image frame In−1 may be represented by [+1, −1], and the magnitude of the motion vector V2 is equal to the square root of two.

In addition, the magnitude of the motion vector may indicate the degree to which the image in the corresponding block (Bxx) is moved. In other words, a large motion vector may indicate that the motion of the image in the corresponding block Bxx is large and fast, and a small motion vector may indicate that the motion of the image in the corresponding block Bxx is small and slow.

The display apparatus 100 analyzes the direction of the motion vector (1130).

The image processor 160 may calculate the direction of the motion vector calculated in operation 1110. The direction of the motion vector may be calculated by the square of an x-axis component of the motion vector and the arc tangent of a y-axis component of the motion vector.

For example, the motion vector V1 of the block-32 B32 of the n−1$^{th}$ image frame In−1 may be expressed as [+1, −1], and the direction of the motion vector V1 is at 45 degrees clockwise from the x-axis direction. In addition, the motion vector V2 of the block-43 B43 of the n−1$^{th}$ image frame In−1 may be expressed as [+1, −1], and the direction of the motion vector V2 is at 45 degrees clockwise from the x-axis direction.

In addition, the direction of the motion vector may indicate the direction in which the image in the corresponding block (Bxx) has been moved. In other words, the direction of the motion vector may indicate the direction in which an object in the image has been moved or the photographer has been moved.

The display apparatus 100 analyzes the histogram of the motion vectors (1140).

The image processor 160 may generate a histogram of the motion vectors calculated in operation 1110. The motion vector histogram may indicate the frequency of the blocks Bxx according to the magnitude and direction of the motion vector. In other words, the motion vector histogram may indicate the number of blocks Bxx having the same motion vector magnitude and/or the same motion vector direction.

The image processor 160 may determine the distribution of the magnitudes of the motion vectors of the entire image and the distribution of the directions of the motion vectors of the entire image from the motion vector histogram.

The display apparatus 100 determines the motion characteristic of the image (1150).

The image processor 160 may determine the motion characteristic of the image on the basis of the magnitude of the motion vector, the direction of the motion vector, and the histogram of the motion vectors.

For example, the image processor 160 may determine whether the motion of the image is the motion of an object in the image or the motion of the entire image (e.g., the movement of the photographer).

As shown in FIG. 7, when the motion vectors are intensively generated in a specific portion (a motion detection region R) of the image, the image processor 160 may determine that a movement of an object in the image has occurred.

Figure 8A:
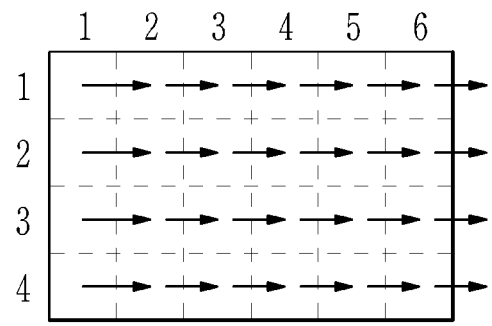
FIG. 8A illustrates an example of determining a characteristic of an image on the basis of a motion vector by the determination method shown in FIG. 6.
Figure 8B:
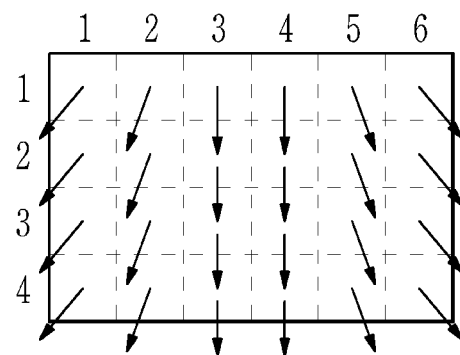
FIG. 8B illustrates an example of determining a characteristic of an image on the basis of a motion vector by the determination method shown in FIG. 6.
Figure 8C:
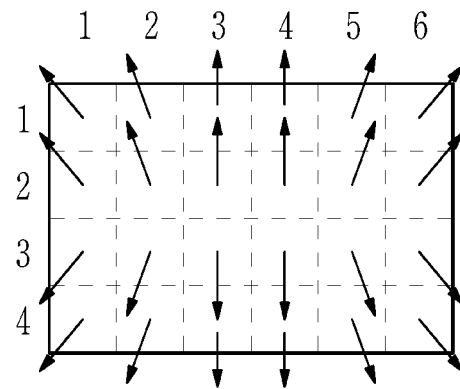
FIG. 8C illustrates an example of determining a characteristic of an image on the basis of a motion vector by the determination method shown in FIG. 6.

As shown in FIGS. 8A, 8B, and 8C, when the motion vectors are generated in the entire image, the image processor 160 may determine that a movement of the entire image (for example, a movement of the photographer) has occurred.

Furthermore, as shown in FIG. 8A, motion vectors having the same magnitude and the same direction may be calculated in all blocks B11 to B64 in the image. In this case, the image processor 160 may determine that a 'panning' has occurred. 'Panning' indicates that the photographer or observer takes an image while moving at the same height as the subject. According to the panning, a motion vector in a direction opposite to the moving direction of the photographer or the observer may be generated.

As shown in FIG. 8B, motion vectors headed in a lower direction may be calculated in the center portion of the image, motion vectors headed in a lower left direction may be calculated in the left portion of the image, and motion vectors headed in a lower right direction may be calculated in the right portion of the image. In this case, the image processor 160 may determine that a pilot-view has occurred. 'Pilot-view' indicates that the photographer or observer takes an image while moving at a position higher than the subject. According to the pilot-view, motion vectors headed in a lower direction may be generated in the entire image.

In addition, as shown in FIG. 8C, motion vectors headed in an upper direction may be calculated in the upper portion of the image, and motion vectors headed in a lower direction may be calculated in the lower portion of the image. In this case, the image processor 160 may determine that a 'zoom-in' has occurred. 'Zoom-in' indicates that the photographer or observer takes an image while moving toward the subject. According to the 'zoom-in', motion vectors headed in an upper direction are generated in the upper portion of the image, and motion vectors headed in a lower direction are generated in the lower portion of the image.

As such, the image processor 160 may determine the movement of an object in the image or the movement of the entire image (e.g., the movement of the photographer) on the basis of the magnitude of the motion vector, the direction of the motion vector, and the histogram of the motion vectors.

The display apparatus 100 performs vanishing point analysis of the image (1160).

The image processor 160 performs vanishing point analysis together with the motion vector calculation 1110, the motion vector magnitude analysis 1120, the motion vector direction analysis 1130, the motion vector histogram generation 1140, and the motion characteristic determination of the image 1150.

'Vanishing point' represents a point in which perspective projections of actually parallel straight lines appear to converge. For example, lane lines identifying lanes may converge to a vanishing point VP, as shown in FIG. 9.

The straight lines converging to the vanishing point is not limited to straight lines located on the same plane. For example, as shown in FIG. 9, the extension lines of the upper edges of buildings shown on both sides of the road may converge to the vanishing point VP.

Since the vanishing point represents an infinitely far position, the image processor 160 may determine the depth of the object (for example, the distance from the photographer or the observer to the object) according to the distance to the vanishing point in the image.

For example, as shown in FIG. 8, the distance between the vanishing point VP and a first object O3 is larger than the distance between the vanishing point VP and a second object O4 in the image. The image processor 160 may determine that the first object O3 is located closer to the photographer or observer than the second object O4. In other words, the image processor 160 may determine that the first object O3 is located ahead of the second object O4.

The image processor 160 may determine the relative distances between the objects O3 and O4 and the photographer and/or the front-rear positional relationship between the objects O3 and O4 using the vanishing point analysis of the image.

The display apparatus 100 performs a front object analysis of the image (1170).

The image processor 160 performs the front object analysis together with the motion vector calculation 1110, the motion vector magnitude analysis 1120, the motion vector direction analysis 1130, the motion vector histogram generation 1140, and the motion characteristic determination of the image 1150.

When a vanishing point is not found, the image processor 160 may determine the front-rear positional relationship between objects O5 and O6 using 'the front object analysis'.

The image processor 160 may determine the front-rear positional relationship between the objects O5 and O6 on the basis of the arrangement of the objects O5 and O6 in the image.

The image processor 160 may determine that an object located at a lower side of the image is closer to the photographer or observer than an object located at an upper side of the image. For example, as illustrated in FIG. 10, the image processor 160 may determine that the third object O5 is closer to the photographer or observer than the fourth object O6. In other words, the image processor 160 may determine that the third object O5 is located ahead of the fourth object O6.

The image processor 160 may determine the distances between the objects O5 and O6 and the photographer or the front-rear positional relationship between the objects O5 and O6 using the front object analysis of the image.

The display apparatus 100 generates a depth map of the image (1180).

The image processor 160 may generate a depth map of the image on the basis of the result of the vanishing point analysis and/or the result of the front object analysis.

The 'depth map' may include information about a relative distance between the photographer and objects and/or information about a front-rear positional relationship between the objects. For example, the 'depth map' of the image shown in FIG. 9 may include information about the front-rear relation between the first object O3 and the second object O4, that is, information indicating that the first object O3 is located ahead of the second object O4. In addition, the 'depth map' of the image illustrated in FIG. 10 may include information about the front-rear relation between the third object O5 and the fourth object O6, that is, information indicating that the third object O5 is located ahead of the fourth object O6.

The image processor 160 may memorize the generated 'depth map'.

The display apparatus 100 determines the depth characteristic of the image (1190).

The image processor 160 may determine the depth characteristic of the image on the basis of the depth map.

The 'depth characteristic' may include the relative distance of respective objects in the image (e.g., the distance from the 'photographer' who has photographed the image), the relative positional relationship between the objects and/or the areas occupied by objects located in the front of the image.

The image processor 160 may generate a depth map of the image on the basis of the 'current image frame', and determine the depth characteristic of the image on the basis of the depth map of the image.

The display apparatus 100 determines the characteristic of the image (1195).

The image processor 160 may determine the characteristic of the image on the basis of the motion characteristic of the image and the depth characteristic of the image.

For example, the image processor 160 may synthesize the 'motion vector' of the image and the 'depth map' of the image. In detail, the image processor 160 may match the motion vector of each of the objects in the image with the depth map. As a result of the matching, the image processor 160 may obtain relative position information (the depth map) and motion information (the motion vector) of each object in the image.

The image processor 160 may select one of the video resolution reduction and the frame rate reduction on the basis of motion information of objects in the image. For example, when the objects in the image do not move or move at a speed lower than a reference speed, the image processor 160 may select the frame rate reduction because the image frame complement is easily performed. When the objects in the image move at a speed greater than the reference speed and the distribution of the moving directions of the objects is within a reference angle range, the image processor 160 may select the frame rate reduction because the image frame complement is easily performed. Also, when the objects in the image move at a speed greater than the reference speed and the distribution of the moving directions of the objects is provided in various directions, the image processor 160 may select the video resolution reduction.

The image processor 160 may select one of the video resolution reduction and the frame rate reduction on the basis of motion information of the entire image. For example, in the case of 'panning' in which the entire image is move in the same direction, the image processor 160 may select the frame rate reduction because the image frame complement is easily performed. In the case of 'pilot-view' or 'zoom-in', the direction of the motion varies depending on the position in the image, the image processor 160 may select the video resolution reduction.

The image processor 160 may select one of the video resolution reduction and the frame rate reduction on the basis of the depth map of the objects in the image. For example, when an object located in the front of the image (an object close to the photographer) occupies a large portion of the image, the image processor 160 may select the frame rate reduction. In addition, when objects (objects distant away from the photographer) located in the rear of the image are positioned in a distributed manner, the image processor 160 may select the video resolution reduction.

The image processor 160 may select one of the video resolution reduction and the frame rate reduction on the basis of relative position information and motion information of objects in the image. When one object located in the front of the image moves, the image processor 160 may select the frame rate reduction because the image frame complement is easily performed. When various objects located in the rear of the image move in various directions, the image processor 160 may select the video resolution reduction so that a change in the image frame is rapidly displayed.

As described above, the display apparatus 100 may determine a motion characteristic and a depth characteristic from an image frame, and select one of the video resolution reduction and the frame rate reduction on the basis of the motion characteristic and the depth characteristic. In addition, the display apparatus 100 may simultaneously perform analysis of the motion characteristic and analysis of the depth characteristic in parallel.

Figure 11:
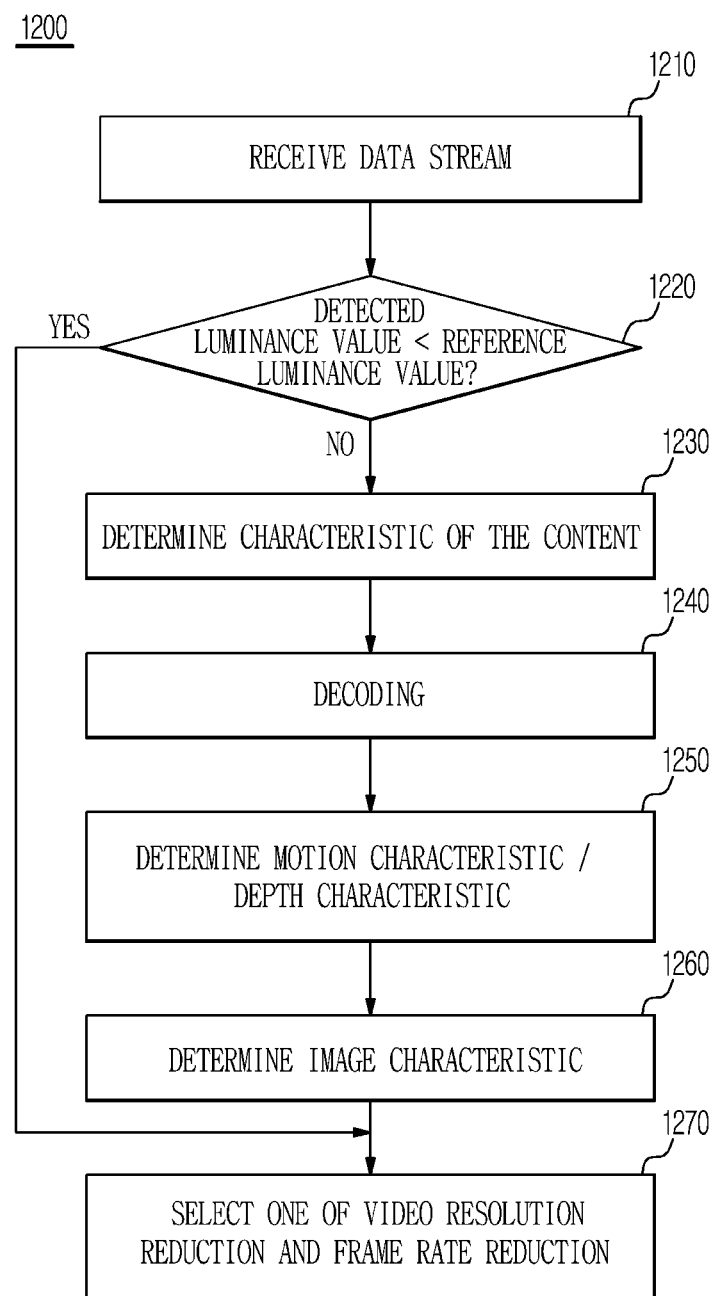
FIG. 11 illustrates another example of an operation of a display apparatus according to an embodiment.

FIG. 11 illustrates another example of an operation of a display apparatus according to an embodiment.

An operation (1200) of the display apparatus 100 is described with reference to FIG. 11.

The display apparatus 100 receives a data stream (1210).

Operation 1210 may be the same as operation 1010 shown in FIG. 5.

The display apparatus 100 determines whether the luminance value detected by the luminance sensor 121 is smaller than a reference luminance value (1220).

The display apparatus 100 may include the luminance sensor 121 that detects an ambient luminance, and the detection result of the luminance sensor 121 may be provided to the image processor 160 through the controller 130.

The image processor 160 may compare the luminance value detected by the luminance sensor 121 with the reference luminance value, and determine whether the luminance value detected by the luminance sensor 121 is smaller than the reference luminance value.

When the luminance value detected by the luminance sensor 121 is smaller than the reference luminance value (YES in operation 1220), the display apparatus 100 selects one of the video resolution reduction and the frame rate reduction (1270).

When the luminance value detected by the luminance sensor 121 is smaller than the reference luminance value, the display apparatus 100 may select the frame rate reduction.

Human eyes are generally known to be insensitive to a change in visual information in the dark. In other words, in a dark place, the user may not recognize a rapid change of the image frame. Accordingly, the image processor 160 may select the frame rate reduction so that the display apparatus 100 displays a high quality image.

When the luminance value sensed by the luminance sensor 121 is not smaller than the reference luminance value (NO in operation 1220), the display apparatus 100 determines the characteristic of the content (1230), decodes the video (1240), determines the motion characteristic and the depth characteristic (1250), and determines the image characteristic (1260).

Operations 1230, 1240, 1250, and 1260 may be the same as operations 1020, 1030, 1040, and 1050, respectively.

Thereafter, the display apparatus 100 selects one of the video resolution reduction and the frame rate reduction on the basis of the characteristics of the image (1270).

The image processor 160 may select one of the video resolution reduction and the frame rate reduction on the basis of the characteristics of the image.

As described above, the display apparatus 100 may select one of the video resolution reduction and the frame rate reduction according to a viewing environment of a user. For example, when the luminance value of the surrounding of the display apparatus 100 is smaller than a predetermined luminance value, the display apparatus 100 may select the frame rate reduction.

The above description has been made in relation that the display apparatus 100 selects one of the video resolution reduction and the frame rate reduction according to the characteristic of the content, the motion characteristic of the image, the depth characteristics of the image, and the viewing environment of a user.

Hereinafter, an operation of the display apparatus 100 according to one of the video resolution reduction and the frame rate reduction will be described.

Figure 12:
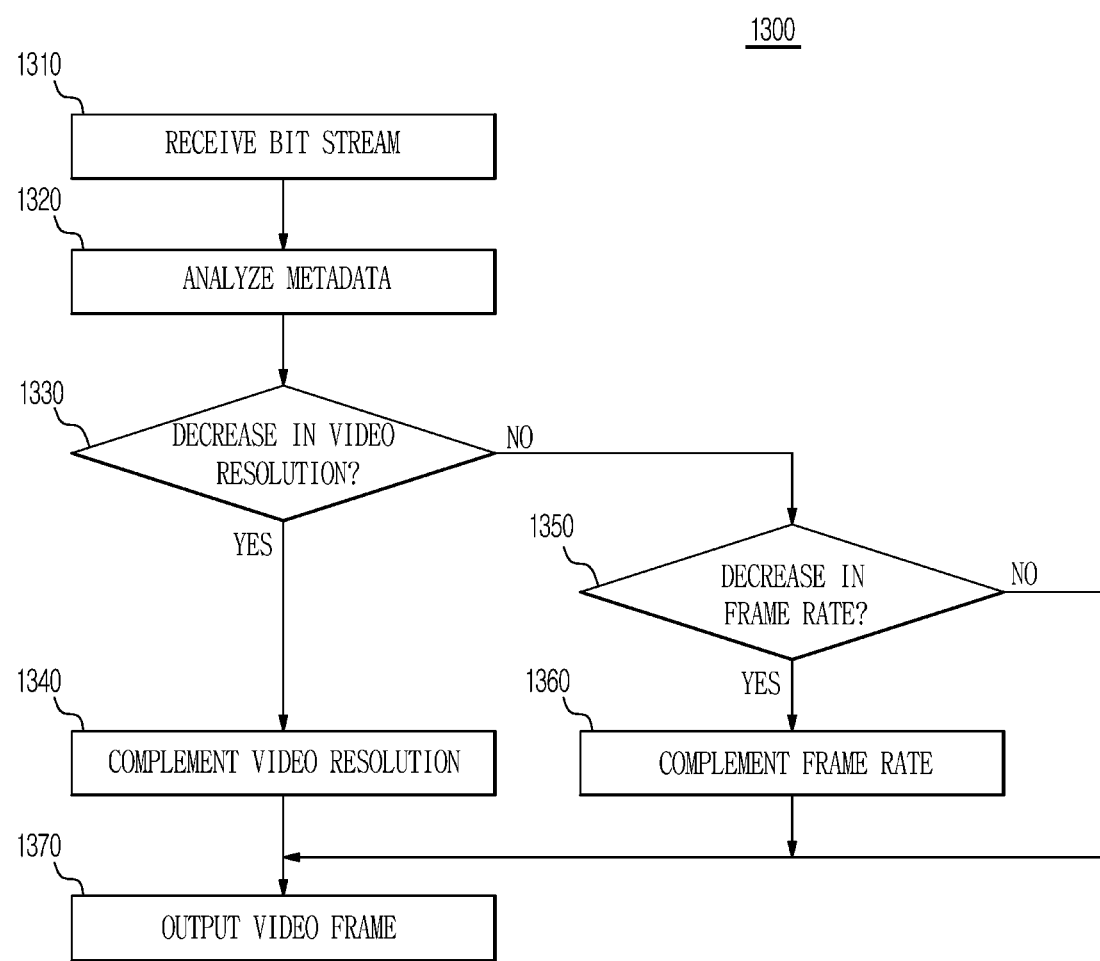
FIG. 12 illustrates an operation pursuant to a video resolution reduction and a frame rate reduction of a display apparatus according to an embodiment.
Figure 13:
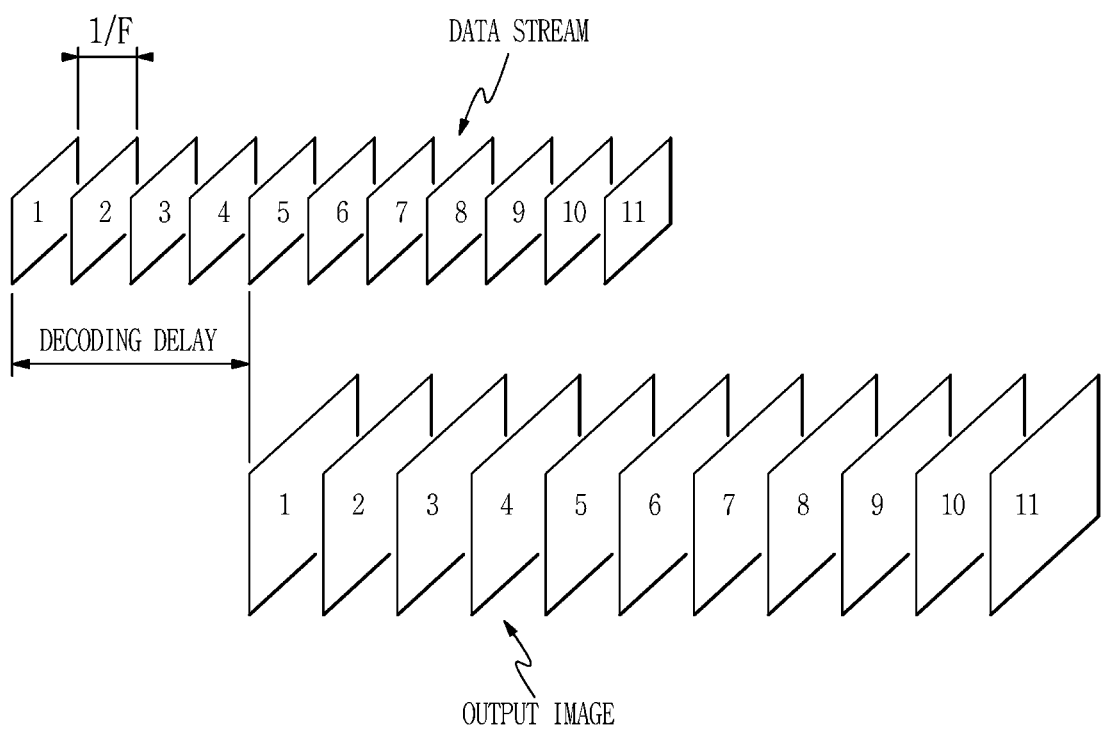
FIG. 13 illustrates an example of decoding an image by the video resolution reduction shown in FIG. 12.
Figure 14:
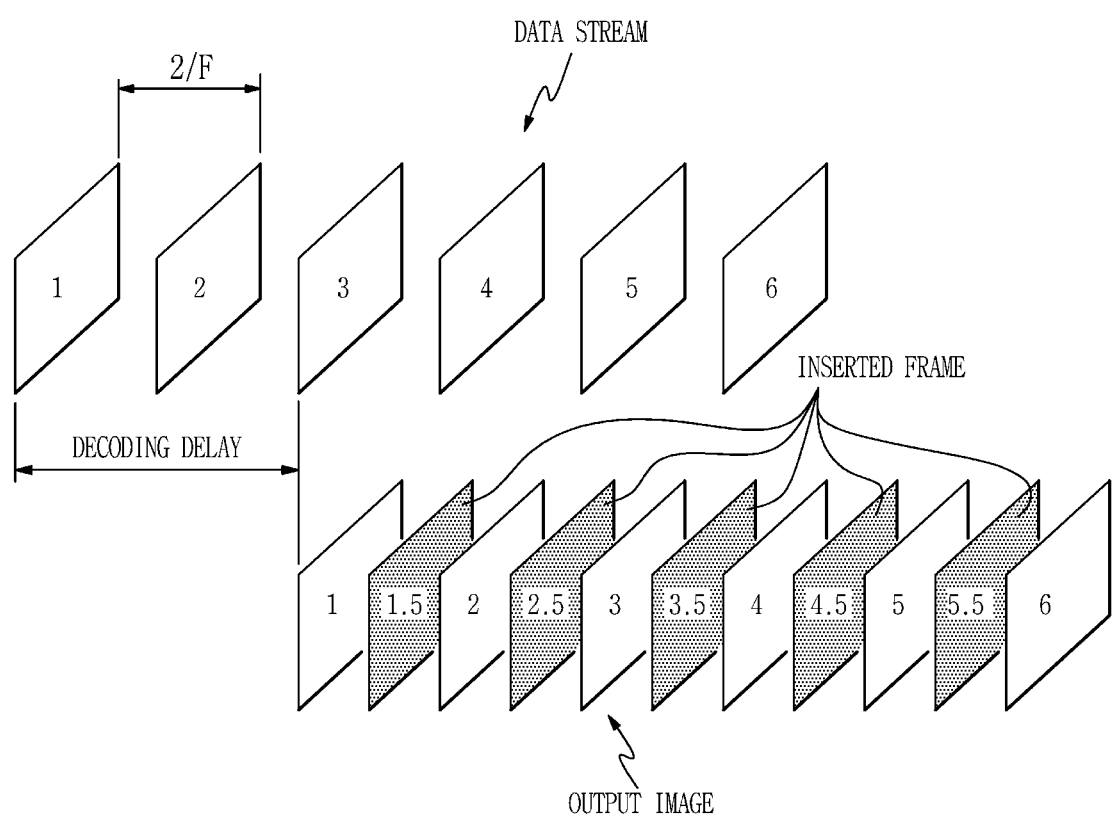
FIG. 14 shows an example of decoding an image by the frame rate reduction shown in FIG. 12.

FIG. 12 illustrates an operation pursuant to a video resolution reduction and a frame rate reduction of a display apparatus according to an embodiment, FIG. 13 illustrates an example of decoding an image by the video resolution reduction shown in FIG. 12, and FIG. 14 shows an example of decoding an image by the frame rate reduction shown in FIG. 12.

Referring to FIGS. 12, 13, and 14, an operation (1300) of the display apparatus 100 is described.

The display apparatus 100 receives a data stream (1310).

Operation 1310 may be the same as operation 1010 shown in FIG. 5. The communicator 150 may receive a data stream from the video service server 2, and output the received data stream to the image processor 160. The image processor 160 receives the data stream from the communicator 150.

The display apparatus 100 analyzes metadata (1320).

The image processor 160 may extract the metadata included in the data stream while receiving the data stream, and analyze the metadata.

Metadata may include metadata regarding content, metadata regarding a video, and metadata regarding an audio. The metadata regarding the video may include information, such as an encoding codec of the video, a video resolution of the video, a frame rate of the video, and the like.

The image processor 160 may extract information regarding the video resolution of the video and the frame rate of the video, among the metadata.

The display apparatus 100 determines whether the video resolution of the video being received has been reduced (1330).

When the traffic of the network is increased, the video service server 2 may transmit a video having a reduced video resolution or a video having a reduced frame rate to provide a seamless video service. In particular, upon receiving a video resolution reduction signal from the display apparatus 100, the video service server 2 transmits a video having a reduced video resolution in response to an increase in traffic of the network.

The display apparatus 100 may determine whether the video resolution has been reduced on the basis of the metadata included in the data stream received from the video service server 2. In detail, the image processor 160 may determine whether the video resolution of the video received from the video service server 2 has been lowered on the basis of the information about the video resolution included in the metadata.

For example, the image processor 160 may store the video resolution included in the metadata in the memory while receiving the data stream. In addition, the image processor 160 may compare the video resolution stored in the memory with the video resolution of the current video. When the video resolution of the current video is smaller than the stored video resolution and the difference between the stored video resolution and the video resolution of the current video is greater than a predetermined error range, the image processor 160 may determine that a decrease in the video resolution of the video has occurred.

As another example, the image processor 160 may compare the video resolution of the current video with a predetermined reference video resolution. The reference video resolution may be set when the display apparatus 100 initially receives the currently received content from the video service server 2. For example, the video service server 2 may notify the display apparatus 100 of the reference video resolution of the content currently being transmitted. When the video resolution of the current video is smaller than the reference video resolution, the image processor 160 may determine that a decrease in the video resolution of the video has occurred.

When it is determined that a decrease in the video resolution of the video has occurred (YES of operation 1330), the display apparatus 100 complements the video resolution of the image (1340).

The image processor 160 may generate an image frame having an increased video resolution to complement the lowered video resolution in response to the decrease in the video resolution. In detail, the image processor 160 may generate a 'complemented image frame' having an improved video resolution on the basis of the 'current image frame', and may output the 'complemented image frame' instead of the 'current image frame'.

For example, as illustrated in FIG. 13, the image processor 160 may decode an image frame-1 of the data stream into a temporary image frame-1, and decode an image frame-2 of the data stream into a temporary image frame-2. In this case, the video resolution of the image frames of the data stream may correspond to half of the reference video resolution.

The image processor 160 may generate an image frame-1 having an increased video resolution from the decoded temporary image frame-1. In order to increase the video resolution of the image frame, the image processor 160 may use interpolation. For example, the image processor 160 generates a new pixel between pixels of an existing image frame, and determine the brightness and color of the new pixel to have an average value of brightness and colors of adjacent existing pixels. As a result, the video resolution of the new image frame may be twice the video resolution of the existing image frame. In addition, the image processor 160 may output the image frame-1 having the increased video resolution instead of the decoded temporary image frame-1.

The image processor 160 may generate an image frame-1 having an increased video resolution from a decoded temporary image frame-2, and output the image frame-2 having the increased video resolution instead of the decoded temporary image frame-2.

In the same manner, the image processor 160 generates an image frame-3, an image frame-4, . . . and an image frame-11 having increased video resolutions, and output the image frame-3, the image frame-4, . . . and the image frame-11 having increased video resolutions instead of the decoded image frames.

When it is not determined that a decrease of the video resolution of the video has occurred (NO in operation 1330), the display apparatus 100 determines whether the frame rate of the video being received is reduced (1350).

When the traffic of the network is increased, the video service server 2 may transmit a video having a reduced video resolution or a video having a reduced frame rate to provide a seamless video service. In particular, upon receiving a frame rate reduction signal from the display apparatus 100, the video service server 2 transmits a video having a reduced frame rate in response to an increase in traffic of the network.

The display apparatus 100 may determine whether the frame rate has been reduced on the basis of the metadata included in the data stream received from the video service server 2. In detail, the image processor 160 may determine whether the frame rate of the video received from the video service server 2 has been lowered on the basis of the information about the frame rate included in the metadata.

For example, the image processor 160 may store the frame rate included in the metadata in the memory while receiving the data stream. Also, the image processor 160 may compare the frame rate stored in the memory with a frame rate of the current video. When the frame rate of the current video is smaller than the stored frame rate and the difference between the stored frame rate and the frame rate of the current video is greater than a predetermined error range, the image processor 160 may determine that a decrease in the frame rate of the video has occurred.

As another example, the image processor 160 may compare the frame rate of the current video with a predetermined reference frame rate. The reference frame rate may be set when the display apparatus 100 initially receives the currently received content from the video service server 2. For example, the video service server 2 may notify the display apparatus 100 of the reference frame rate of the content currently being transmitted. When the frame rate of the current video is smaller than the reference frame rate, the image processor 160 may determine that a decrease in the frame rate of the video has occurred.

When it is determined that a decrease in the frame rate of the video has occurred (YES in operation 1350), the display apparatus 100 complements the frame rate (1360).

The image processor 160 may generate an image frame to complement the lowered frame rate in response to a decrease in the frame rate, and insert the generated image frame between the decoded image frames. In detail, the image processor 160 may generate a 'complementing image frame' on the basis of a previous image frame, and insert the 'complementing image frame' between the 'previous image frame' and the 'current image frame'.

For example, as illustrated in FIG. 14, the image processor 160 may decode an image frame-1 of the data stream into an image frame-1 of an output image, and decode an image frame-2 of the data stream into an image frame-2 of the output image. In this case, the time interval between the image frame-1 and the image frame-2 of the data stream may be twice (2/F) a time interval 1/F according to a reference frame rate (F).

The image processor 160 may generate an image frame-1.5 of the output image. The image frame-1.5 may be provided as the same image frame as the image frame-1 or may be generated by interpolation of the image frame-1 and the image frame-2. After outputting the image frame-1, the image processor 160 may sequentially output the image frame-1.5 and the image frame-2.

In addition, the image processor 160 may generate an image frame-2.5 of the output image. The image frame-2.5 may be provided as the same image frame as the image frame-2 or may be generated by interpolation of the image frame-2 and the image frame-3. After outputting the image frame-2, the image processor 160 may sequentially output the image frame-2.5 and the image frame-3.

In the same manner, the image processor 160 generates an image frame-3.5, an image frame-4.5, and an image frame-5.5, inserts the image frame-3.5 between the image frame-3 and an image frame-4, and inserts the image frame-4.5 between the image frame-4 and an image frame-5, and inserts the image frame 5.5 between the image frame-5 and an image frame-6.

When it is not determined that a decrease in the frame rate of the video has occurred (NO in operation 1350), the display apparatus 100 outputs the decoded image frames (1370).

Even after the video resolution or frame rate is complemented, the display apparatus 100 may output the decoded image frames.

The image processor 160 may transmit the decoded or complemented image frame to the image display 170. The image display 170 may display the image frame received from the image processor 160 on the display panel 172.

As described above, when a video having a reduced video resolution is received from the video service server 2, the display apparatus 100 may increase the video resolution of the image frame and output the image frame having the increased video resolution. In addition, when a video having a reduced frame rate is received from the video service server 2, the display apparatus 100 may insert an image frame to thereby output an image frame having an increased frame rate.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A display apparatus comprising:
a display;
a communicator configured to communicate with a video service server; and
a processor configured to:
receive video content from the video service server through the communicator,
decode the received video content into an image frame for display on the display,
output the image frame for display on the display,
wherein the processor is configured to, based on network traffic becoming greater than a reference value:
select, based on an image characteristic of the video content, a video resolution reduction signal for allowing the video service server to transmit video content having a resolution lower than a reference resolution or a frame rate reduction signal for allowing the video service server to transmit video content having a frame rate lower than a reference frame rate; and
transmit the video resolution reduction signal or the frame rate reduction signal to the video service server through the communicator, and
wherein the image characteristic of the video content comprises a motion characteristic, and the motion characteristic is based on motion vectors of the image frame.

2. The display apparatus of claim 1, wherein the processor is configured to select the video resolution reduction signal or the frame rate reduction signal further based on metadata of the video content.

3. The display apparatus of claim 1, wherein the processor is configured to, based on the motion vectors having magnitudes smaller than a second reference value, select the frame rate reduction signal.

4. The display apparatus of claim 1, wherein the processor is configured to, based on the motion vectors having magnitudes larger than a second reference value and having directions distributed within a predetermined angle range, select the frame rate reduction signal.

5. The display apparatus of claim 1, wherein the processor is configured to, based on the motion vectors having magnitudes larger than a second reference value and having directions distributed outside a predetermined angle range, select the video resolution reduction signal.

6. The display apparatus of claim 1, wherein the processor is configured to select the video resolution reduction signal or the frame rate reduction signal further based on a depth map of the image frame.

7. The display apparatus of claim 1, wherein the processor is configured to:
based on receiving the video content having a resolution lower than the reference resolution from the video service server, convert the image frame into an image frame having the reference resolution, and control the display to output the image frame having the reference resolution.

8. The display apparatus of claim 1, wherein the processor is configured to:
based on receiving the video content having a frame rate lower than the reference frame rate from the video service server, generate a complementing image frame based on the image frame, and control the display to output the complementing image frame.

9. The display apparatus of claim 1, further comprising:
a luminance sensor configured to detect a luminance of a surrounding of the display apparatus,
wherein the processor is configured to select the video resolution reduction signal or the frame rate reduction signal based on a luminance value detected by the luminance sensor.

10. The display apparatus according to claim 1, wherein the image characteristic of the video content further comprises a type characteristic of the video content.

11. The display apparatus according to claim 1, wherein the network traffic is determined by the display apparatus based on traffic information obtained from an external apparatus.

12. A display method of a display apparatus, the method comprising:
receiving, by the display apparatus, video content from a video service server through a network;
decoding, by the display apparatus, the video content into an image frame;
displaying, by the display apparatus, the image frame; and
based on network traffic becoming greater than a reference value:
selecting, by the display apparatus, based on an image characteristic of the image frame, a video resolution reduction signal for allowing the video service server to transmit video content having a resolution lower than a reference resolution or a frame rate reduction signal for allowing the video service server to transmit video content having a frame rate lower than a reference frame rate; and
transmitting, by the display apparatus, the video resolution reduction signal or the frame rate reduction signal to the video service server,
wherein the image characteristic of the video content comprises a motion characteristic, and the motion characteristic is based on motion vectors of the image frame.

13. The display method of claim 12, further comprising:
detecting a luminance of a surrounding of the display apparatus, wherein
the selecting of the video resolution reduction signal or the frame rate reduction signal is further based on the detected luminance value.

14. The display method of claim 12, further comprising:
based on receiving the video content having a resolution lower than the reference resolution from the video service server, converting the image frame into an image frame having the reference resolution; and
displaying the image frame having the reference resolution.

15. The display method of claim 12, further comprising:
based on receiving the video content having a frame rate lower than the reference frame rate from the video service server, generating a complementing image frame based on the image frame; and
displaying the complementing image frame.

16. A display apparatus comprising:
a display;
a communicator configured to communicate with a video service server; and
a processor configured to:
receive video content from the video service server through the communicator,
decode the video content into an image frame, and
output the image frame for display on the display,
wherein the processor is configured to, based network traffic becoming greater than a reference value:
select, based on a depth characteristic of the video content, a video resolution reduction signal for allowing the video service server to transmit video content having a resolution lower than a reference resolution or a frame rate reduction signal for allowing the video service server to transmit video content having a frame rate lower than a reference frame rate; and
transmit the video resolution reduction signal or the frame rate reduction signal to the video service server through the communicator.

* * * * *